United States Patent
Deininger et al.

(10) Patent No.: US 9,594,606 B2
(45) Date of Patent: Mar. 14, 2017

(54) RUNTIME EXTENSION FRAMEWORK

(75) Inventors: Thomas A. Deininger, Ambler, PA (US); Michael S. Horn, Bath, PA (US); Michael Hogan, Schwenksville, PA (US); John J. Mautz, Clifton Heights, PA (US)

(73) Assignee: SIEMENS INDUSTRY, INC., Alpharetta, GA (US)

( * ) Notice: Subject to any disclaimer, the term of this patent is extended or adjusted under 35 U.S.C. 154(b) by 1866 days.

(21) Appl. No.: 11/758,846

(22) Filed: Jun. 6, 2007

(65) Prior Publication Data

US 2007/0283364 A1 Dec. 6, 2007

Related U.S. Application Data

(60) Provisional application No. 60/811,284, filed on Jun. 6, 2006.

(51) Int. Cl.
*G06F 9/54* (2006.01)

(52) U.S. Cl.
CPC ........ *G06F 9/542* (2013.01); *G06F 2209/544* (2013.01)

(58) Field of Classification Search
None
See application file for complete search history.

(56) References Cited

U.S. PATENT DOCUMENTS

| 6,505,247 B1* | 1/2003 | Steger et al. ................ 709/224 |
| 6,961,753 B1* | 11/2005 | Osburn, III .................. 709/203 |
| 7,073,182 B1* | 7/2006 | Osburn, III .................. 719/328 |
| 2002/0067370 A1* | 6/2002 | Forney et al. ............... 345/742 |
| 2002/0133634 A1* | 9/2002 | Bieber ......................... 709/310 |
| 2004/0034860 A1 | 2/2004 | Fernando |
| 2005/0267882 A1* | 12/2005 | Aupperlee et al. ............. 707/4 |
| 2007/0078555 A1* | 4/2007 | Dorgelo et al. .............. 700/108 |

* cited by examiner

*Primary Examiner* — Syed Roni

(57) ABSTRACT

The present invention is a novel device, system, and method for runtime extension framework architecture for extending a system. According to an exemplary embodiment of the present invention, a runtime extension framework architecture may have an event manager for identifying and coordinating handling of events. The architecture may have two or more event handlers. Some event handlers may be dedicated to handling events associated with interfacing with an application program interface and some of the internal event handlers handle events as directed by the event manager.

20 Claims, 9 Drawing Sheets

RUNTIME EXTENSION FRAMEWORK

TECHNICAL FIELD

The present invention relates to an extension architecture for systems and more particularly, to a device, method, and system for providing an event based framework for extending a system.

BACKGROUND INFORMATION

Manufacturing systems and other control systems for dynamic process may be regulated by Distributed Control Systems (DCS). Typically, the DCS monitors and controls the various mechanical components, for example, regulators, flow controllers valves, gauges, filters, heaters, temperature controllers, liquid-drop out assemblies, vaporizers, and more. The DCS functions like a node network in that various components and sub-systems function independently. The various components and sub-systems are networked to communicate and provide status information.

The DCS uses a processor and software, often custom and proprietary interfaces and protocols, to communicate and direct the various components. The processor receives, translates, and transmits information from components using a variety of application program interfaces. Typically, human interaction with a DCS may be handled via a sub-system known as the Human/Machine Interface (HMI). Often, modern HMIs support abstraction layers that permit them to interact with several different kinds of controllers simultaneously. Thus, modern HMIs are often used as a proxy layer for supervisory applications, such as Batch management Systems, Manufacturing Execution Systems and the like.

Due to this role as an "enabling layer", HMI's are often the most attractive DCS element for system modernization. Under favorable circumstances, users may readily swap out existing HMIs and leave existing controllers in place. Unfortunately, the "enabling" characteristics of such a swap are often disappointing in practice, since supervisory applications often use interaction models that may be foreign to legacy DCS controllers. These legacy controllers may use proprietary communications protocols and interaction models to implement special capabilities, such as Batch Control, and as a result, they are often incapable or interacting fruitfully with any system that does not speak their particular language. With this in mind, it may be useful to extend the behavior of the HMI layer so that it can adapt various pieces of legacy DCS hardware, each with their own protocol, to successfully interact with modern applications, and also to add capabilities such as redundancy, global alarm acknowledgement etc. that may have been lacking in the legacy systems, but which are viewed as basic, essential capabilities. Embodiment of the present invention may also retrofit to the HMI sub-system of a DCS can bring a consistent look and feel to a formerly "patchwork" system.

Accordingly, a need exists for a device, method, and system for providing a framework for extending an existing system in a uniform manner. In addition, a need exists for providing plug-in modules for interfacing with various program interfaces in a uniform manner. There may be an additional need to reduce maintenance and training and experience required by the personnel utilizing the DCS.

SUMMARY

The present invention is a novel device, system, and method for runtime extension framework architecture for extending a system. The present invention may be capable of extending the behavior of applications even if said applications were not designed for such extension. Further, the present invention may allow the behavior of applications to be modified over time, thus permitting a system's behavior to "grow" over time. According to an exemplary embodiment of the present invention, runtime extension framework architecture may have an event manager for identifying and coordinating handling of events. The architecture may have two or more event handlers. Some event handlers may be dedicated to handling events associated with interfacing with an application program interface and some of the internal event handlers handle events as directed by the event manager.

The present invention may incorporate one or more of the following exemplary embodiments. In an exemplary embodiment, some of the event handlers may be a distributed control system adapter; some of the event handlers may be a batch adapter; and the event manager may be a batch manager for controllers of the distributed control system. In another exemplary embodiment, some of the event handlers may be a distributed control system adapter; some of the event handlers may be a persist agent for determining when events are stored in a persisted data store; and the event manager may provide persist runtime state information. In another exemplary embodiment, some of the event handlers may be a distributed control system adapter; some of the event handlers may be a persist agent for determining when events are communicated to other computers of the distributed control system; and the event manager may provide synchronization of state information for the distributed control system. In another exemplary embodiment, some of the event handlers may be a distributed control system adapter; some of the event handlers may be an alarm state adapter for communicating with a distributed control system controller and a human media interface; and the event manager may coordinate alarm behavior between the controller and the human media interface. In another exemplary embodiment, some of the event handlers may be a distributed control system adapter; some event handlers may be a resource pool manager; and the event manager may coordinate pooled resources of the distributed control system. In yet another exemplary embodiment, some of the event handlers may be a distributed control system adapter; some of the event handlers may be a peer manager and may coordinate resource assignment of the distributed control system; and the event manager may coordinate between two or more controllers of the distributed control system.

It is important to note that the present invention is not intended to be limited to a system or method which must satisfy one or more of any stated objects or features of the invention. It is also important to note that the present invention is not limited to the exemplary embodiments described herein. For example, although the exemplary system is described in relation to a DCS, objects and features may be utilized with regard to other application program interfaces or interface systems in general. Modifications and substitutions by one of ordinary skill in the art are considered to be within the scope of the present invention, which is not to be limited except by the following claims.

BRIEF DESCRIPTION OF THE DRAWINGS

These and other features and advantages of the present invention will be better understood by reading the following detailed description, taken together with the drawings herein.

DETAILED DESCRIPTION

Figure 1:
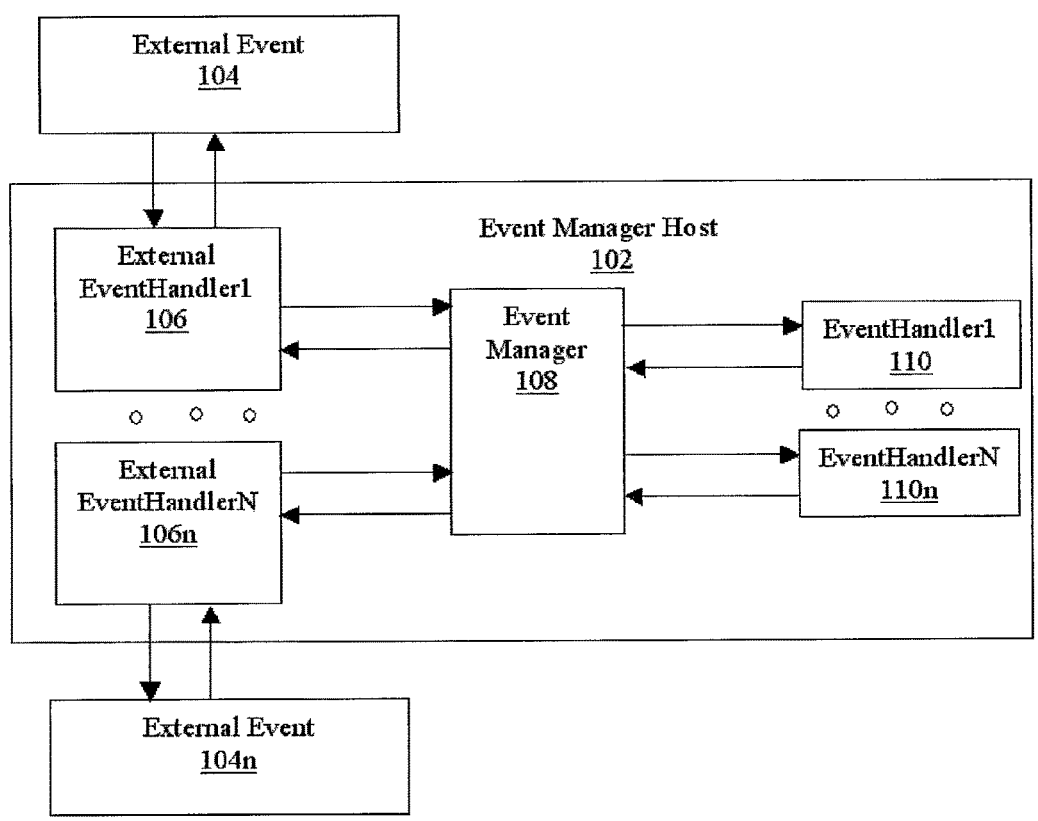
FIG. 1 is a block diagram of an exemplary event based runtime extension framework architecture 100 according to the present invention.

Referring to FIG. 1, a possible configuration is shown utilizing an exemplary event based Runtime Extension Framework (REF) architecture 100. An event manager host 102 receives and transmits external events 104-104n for a system, for example, an application program interface of a DCS. One or more external event handlers 106-106n may be configured to convert, translate, transmit, receive and/or identify events from the Application Program Interface (API) and/or the Human Machine Interface (HMI). The external event handlers 106-106n provide a framework for extending an existing system in a uniform way, so that it is possible to create "plug-in" extensions to enhance functionality. Each external event handler 106-106n may be designed to handle specific events or a category of events.

Internal event handlers 110-110n handle responses to events related to the actual extension of the system. The response may be produced and designed via the HMI allowing the operator to work with a consistent interface. An event interface may provide the ability to create a set of Event Handlers that encapsulate the behavior of various system API's that provide a uniform interface for dealing with various different API's. This same event interface can be used to create additional "plug-in" extensions that extend the behavior of the system.

The event manager 108 coordinates the event handlers and events. Events are passed through the system through a centralized Event Manager 108. Plug-In "Event Handlers" 106 and 110 can subscribe to receive events that are raised via the Event Manager 108. Some event handlers are conceptually external event handlers 106, since they are responding to events from the outside world (such as the system being extended). While there is no real difference between internal event handlers 110 and external event handlers 106, they are conceptually different in that they generally may include various use interfaces as would be known to an individual skilled in the art. For example, a WinCC Data Manager interface may be required to use a WinCC API for accessing tag data from WinCC. A system (for example PCS 7/OS) often provides a set of API's that allow for interfacing to the system. These API provide for a means to create applications that "extend" the system. The "plug-in" Event Handlers 106, 110 can be simple to create, not requiring the full knowledge of the underlying API of the system being extended.

Figure 2A:
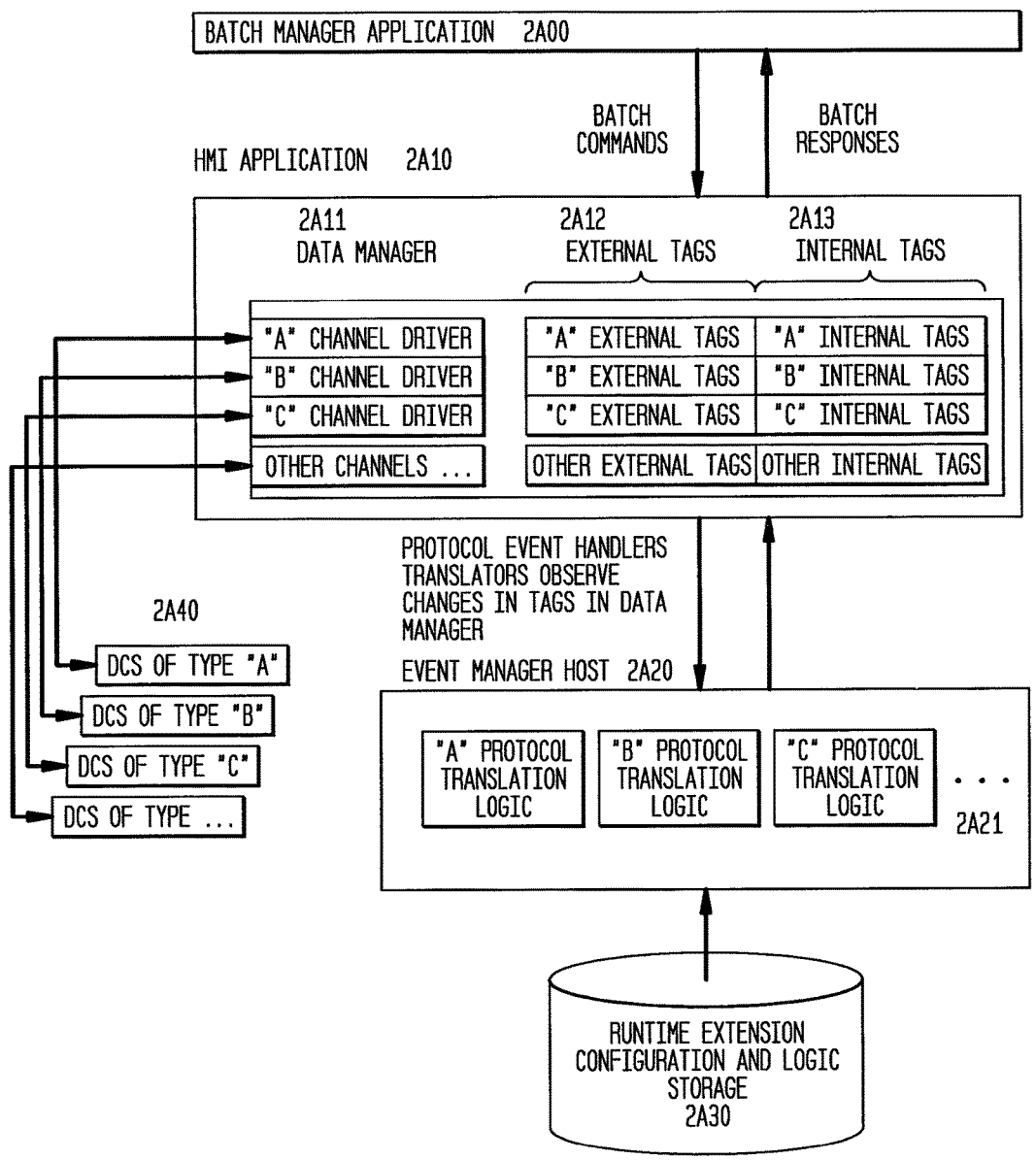
FIG. 2A is a block diagram of an exemplary batch manager controller using event based runtime extension framework architecture according to the present invention.
Figure 2B:
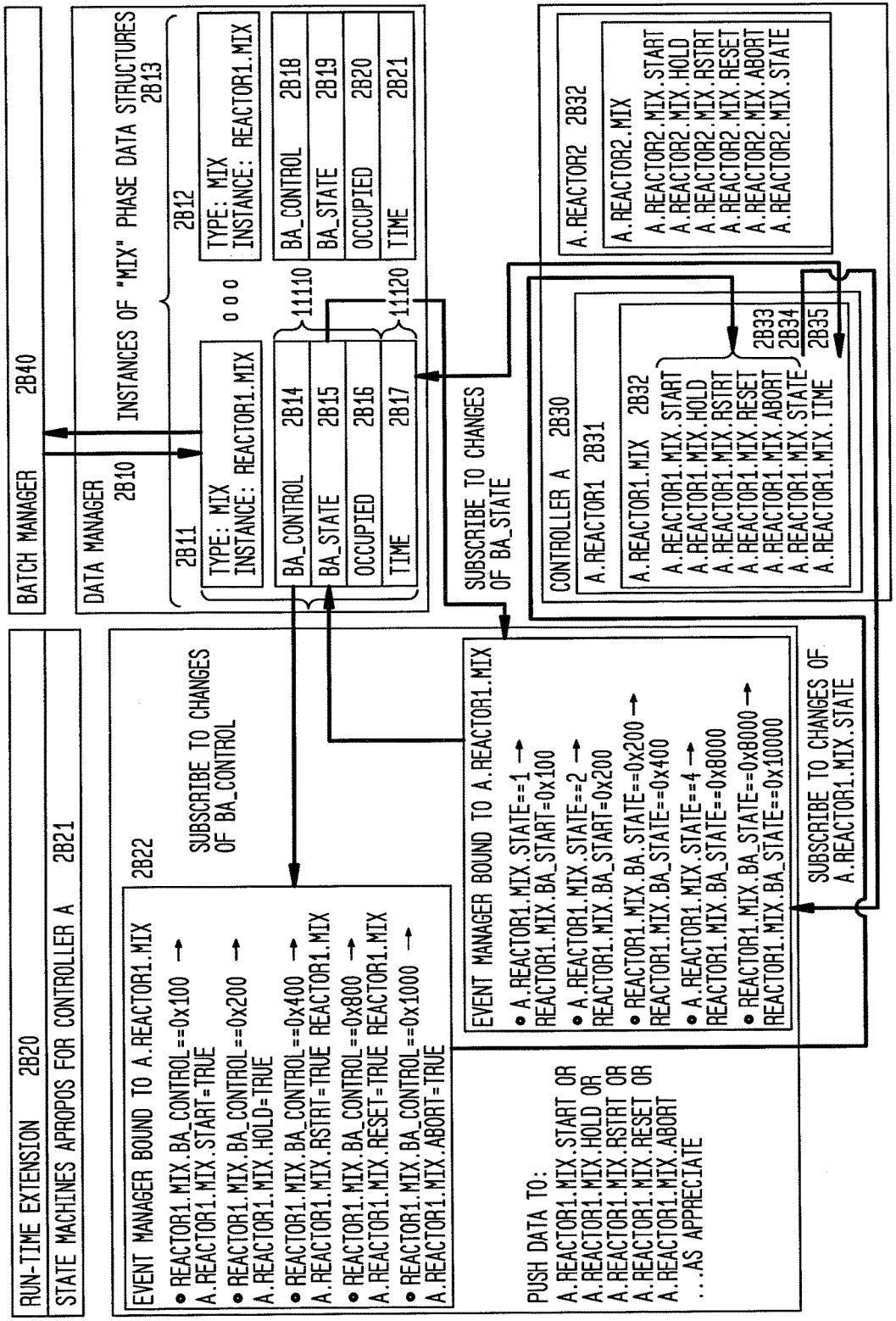
FIG. 2B is a more detailed block diagram of an exemplary batch manager controller using event based runtime extension framework architecture according to the present invention.
Figure 3:
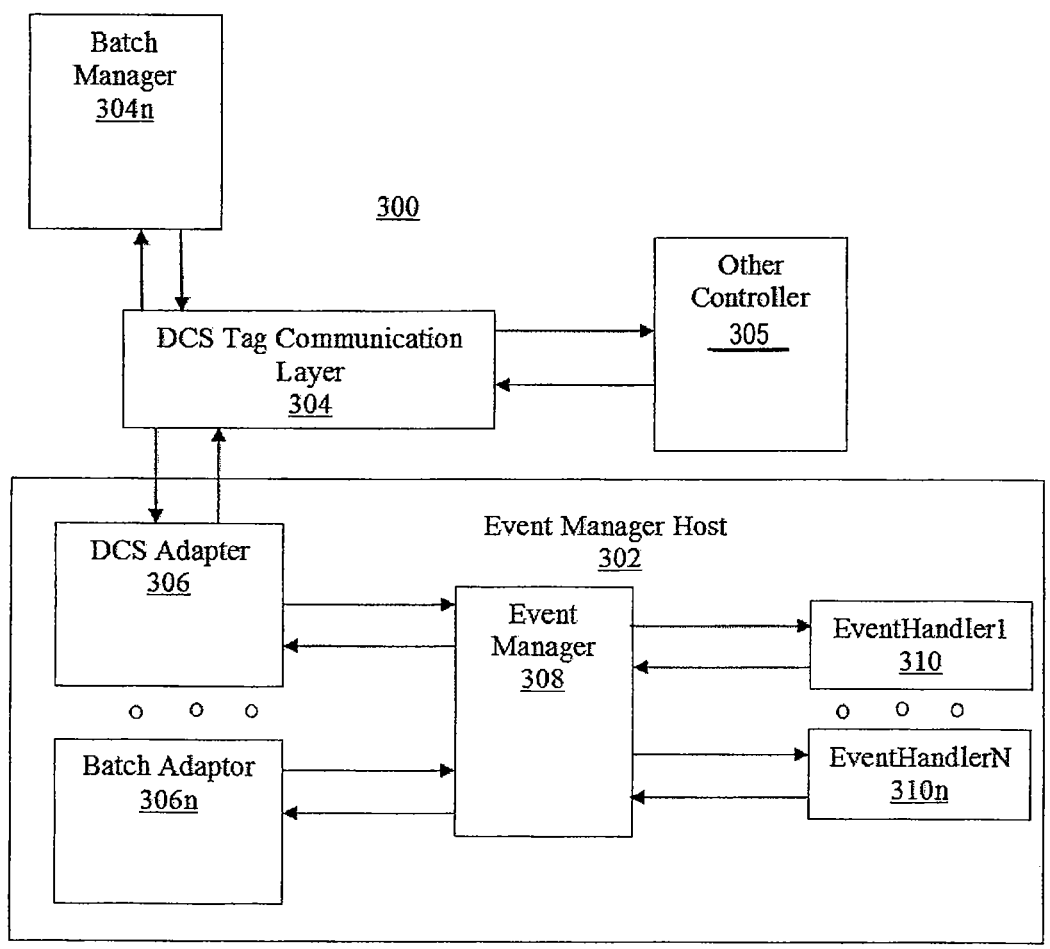
FIG. 3 is a overview block diagram of an exemplary batch manager controller using event based runtime extension framework architecture 300 according to the present invention previous described in FIGS. 2A and 2B.

Referring to FIGS. 2A, 2B and 3, an example embodiment used to illustrate features of the Run Time Extension concept is its use as a protocol translation layer in order to support communications between an application known as a Batch Manager and various legacy DCS controllers. In this embodiment, the Batch management system expects a certain interaction model when sending batch-related commands to a DCS. Ordinarily, this would prevent the Batch Manager from successfully managing batch control in legacy DCS equipment, since most DCS controllers have proprietary interaction models for Batch Control and these interaction models are incompatible with the interaction model expected by out Batch Manager. However, it is possible to use the Run Time Extension Framework such that it is able to function as a bi-directional protocol translation later, thus converting commends form our batch Manger into semantically equivalent commands for diverse DCS controllers and conversely translating the diverse responses from said controllers into semantically equivalent responses that can be successfully interpreted by our batch management system.

FIG. 2A shows an overall view of the process. The Batch Manager Application 2A00 communicates with DCS controllers indirectly, using an HMI application 2A10 as a proxy. This allows the Batch manager to disregard the details of communicating with said DCS controllers, since the HMI application handles the details of such interactions. However, since the controllers in our exemplary embodiment are legacy controllers 2A40, the commands issued by the Batch Manager have no inherent meaning to said controllers. In order to translate said Batch Commands, a Run Time Extension application residing in the Event manager Host application 2A20 observes changes in the tags managed by our HMI application 2A10. This Run Time Extension has Event Handlers which observe changes in Batch relevant tags and react by making appropriate changes to other tags in order to implement a protocol translation. Thus, the run time extension translates commands from the Batch Manager which have no inherent meaning to our legacy DCS equipment into commands which the legacy DCSs can understand Conversely, the protocol translation Event Handlers in our Batch protocol translation extension observe changes in tags that originate in our various DCS controllers 2A40. When, e.g. the protocol translator for DCS A sees a "Batch Relevant" change in a Controller A tag, it may respond by altering a corresponding tag in the Data Manager such that the Batch Manager will subsequently see the (translated) change and correctly interpret this as a Batch Relevant response from controller A. The precise behavior of the runtime extension may be governed by the "Runtime Extension configuration and logic storage" 2A30, which describes which Event Handlers are present, how they are choreographed via the Event Manager, how they are bound to events and in some cases the precise logic that a given event manager performs. In the exemplary embodiment, this information may be stored in a single XML file or alternative storage formats.

FIG. 2B shows this process in greater detail, and these details help illustrate how rich the run-time extension behavior can be. The Batch Manger 2B40 sends commands to the phase Reactor1.Mix 2B11 by writing to its BA_CONTROL tag 2B14. Changes to the Reactor1.Mix.BA_CONTROL tag 2B14 are observed by an instance of an Event Handler which functions as a protocol translation state machine 2B22 that is apropos for managing translating the batch manager control protocol to corresponding commands that are sent to elements in Controller A 2B30. For example, when the Batch Manager 2B40 sends the hex value 0x100, corresponding to the command "Start", the Event Manager comprising a "Controller A BA_CONTROL state machine" 2B22 will send the value "TRUE" to the tag A.Reactor1.Mix.START. Similarly, when the Batch Manager 2B40 sends the hex value 0x200, corresponding to the command "HOLD", the Controller A BA_CONTROL state machine 2B22 will send the value "TRUE" to the tag A.Reactor1.Mix.HOLD. In this particular case, the state machine is translating BA_STATE values to individual tag writes to specific items in Controller A.

The Batch Manager 2B40 receives notification of changes in the state of phases via the BA_STATE tag, for example Controller A Reactor1 Mix's BA_STATE tag 2B15. Reactor1.Mix.BA_STATE tag 2B15 is controlled by a state machine 2B23 that is apropos for Controller A 2B30. In the example, the BA_STATE state machine 2B23 subscribes to changes in Controller A's A.Reactor1.Mix.STATE tag 2B34 and also subscribes to changes in the very Reactor1Mix.BA_STATE tag 2B15 that it controls. In the example, a change of A.Reactor1.Mix.STATE tag 2B34 to the value 1, indicating "RUNNING" will result in a corresponding write to the Reactor1 Mix.BA_STATE tag 2B15 of the hex value 0x100, which informs the Batch Manager 2B40 that the phase is now in a RUNNING state. Similarly, a change of A.Reactor1.Mix.STATE tag 2B34 to the value 2, indicating "HOLD" will result in a corresponding write to the Reactor1 Mix.BA_STATE tag 2B15 of the hex value 0x200, which informs the Batch Manager 2B40 that the phase is now in a HOLDING state. Since the BA_STATE state machine 2B23 is subscribed to the Reactor1 Mix.BA_STATE tag 2B15, it will see the value of Reactor1 Mix.BA_STATE 2B15 change some time later to the value 0x200 and it will react by writing the value 0x400 to Reactor1 Mix.BA_STATE 2B15, informing the batch manager 2B40 that the phase is now in a HOLD state. Note that this mechanism has effectively taken Controller A's "HOLD" state and augmented with a preceding "HOLDING" state that is expected by the batch manager. In this example, our state machine may not only translating values, but may synthesizing additional, necessary state information as part of its protocol translation.

In some cases, the state machines are substantially more complex and employ all of the above mentioned mechanisms value (tag mapping, value (value mapping and state augmentation and also may have complicated interaction between various entities in the data manager and the control target. The above examples are only representative descriptions.

It is worth noting that this complex translation of interaction models via a Run Time Extension constitutes a significant extension to the behavior of the HMI application, and that this extension in behavior is achieved without the HMI application having been designed for such an extension. The HMI application may have no "awareness" of the Batch manager, no "awareness" of the legacy DCSs as such and no knowledge of the various (incompatible) interaction models expected by the Batch manager and the various DCS controllers. Embodiments of the present invention may provide ability to retroactively extend the capabilities of diverse applications. This example provides retroactively extending the HMI application such that it behaves as a protocol translation layer between otherwise incompatible subsystems in a Batch Control application.

Referring to FIG. 3, a overview of a configuration batch manager controller using event based runtime extension framework architecture 300 as previously described in detail with regard to FIGS. 2A and 2B is shown. An event manager host 302 receives and transmits external events for a system, for example, events associated with a DCS Tag communication layer 304 from a batch manager 304n and various controllers 305 of a DCS. One or more external event handlers acting as DCS adaptors 306-306n may be configured to convert, translate, transmit, receive and/or identify events from the DCS Tag Communication layer 304.

Internal event handlers 310-310n handle responses to events related to the actual extension of the system. An event manager 308 coordinates the event handlers and events. Events are passed through the system through a centralized event manager 308. Plug-In DCS and batch adaptors 306 and 306n and event handlers 310 can subscribe to receive events that are raised via the event manager 308. The event manager 308 notifies the batch adapter 306n of changes to "subscribed tags", for example, provox unit point status and simatic batch common words. The batch adaptor 306n writes back changes of Tags to the event manager 308.

Figure 4:
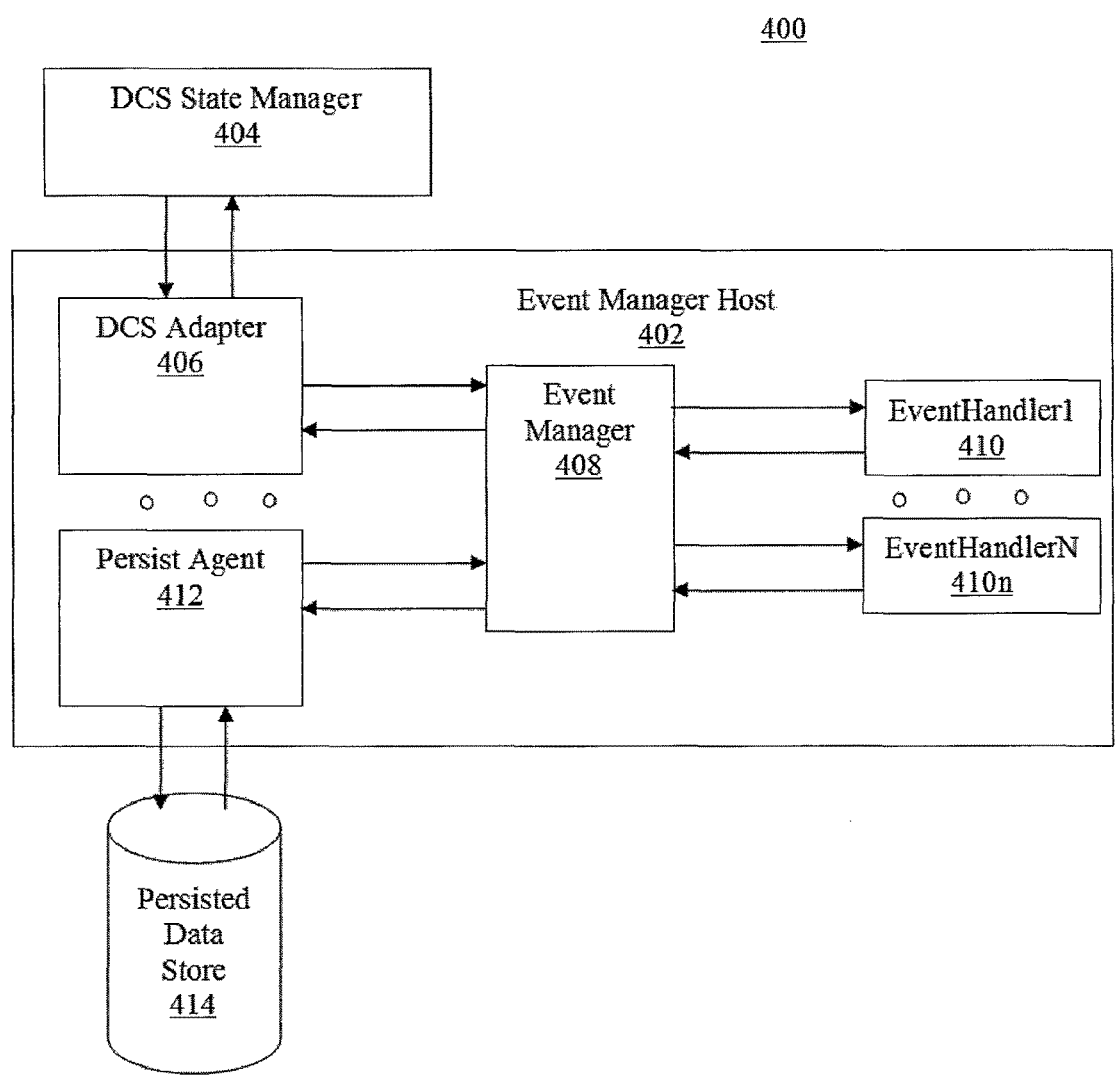
FIG. 4 is a block diagram of an exemplary persistent data storage system using event based runtime extension framework architecture 400 according to the present invention.

Referring to FIG. 4, a possible configuration for persistent data storage system using event based runtime extension framework architecture 400 is shown. An event manager host 402 receives and transmits external events from a DCS state manager. One or more external event handlers acting as DCS adaptors 406 may be configured to convert, translate, transmit, receive and/or identify events.

Internal event handlers 410-410n handle responses to events related to the actual extension of the system. An event manager 408 coordinates the event handlers and events. Events are passed through the system through a centralized event manager 408. Plug-In DCS and batch adaptors 406 and event handlers 410 can subscribe to receive events that are raised via the Event Manager 408. The event handlers may provide a system to persist (saved and restored on restart) various runtime state information that was not originally intended to be persisted. When an event is determined to be updated, a persist agent 412 stores and/or updates a persisted data store 414. The event manager 408 notifies the batch adapter 406 of subscribed changes for data that is being persisted and saved to file. The batch adaptor 406 restores persisted data on, for example, startup to the event manager 408.

Figure 5:
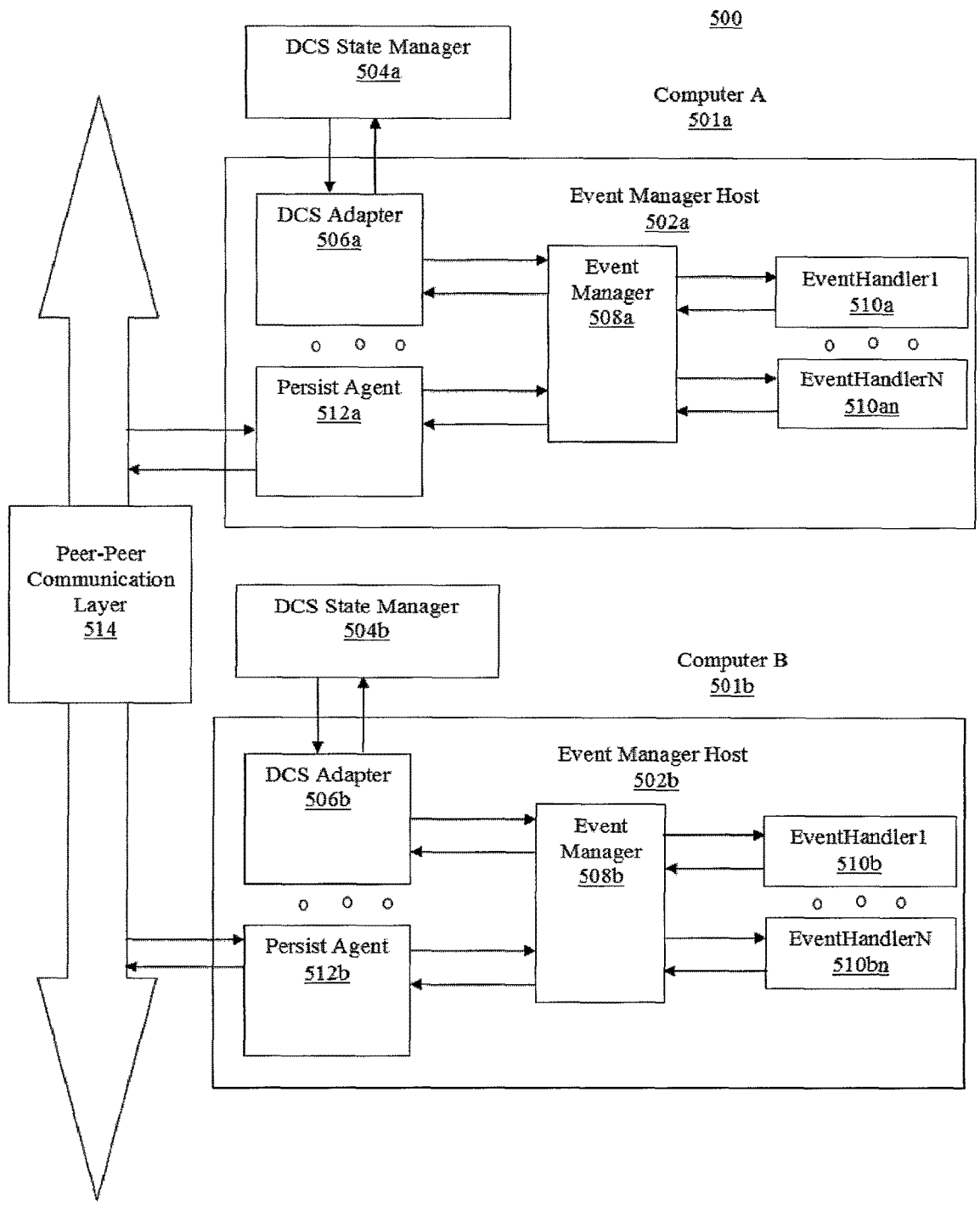
FIG. 5 is a block diagram of an exemplary redundant synchronization data system using event based runtime extension framework architecture 500 according to the present invention.

Referring to FIG. 5, a possible configuration for redundant synchronization data system using event based runtime extension framework architecture 500 is shown. Each event manager host 502a and 502b receives and transmits external events from a respective DCS state manager 504a and 504b. One or more external event handlers acting as DCS adaptors 506a and 506b may be configured to convert, translate, transmit, receive and/or identify events.

Internal event handlers 510a-510an and 510b-510bn handle responses to events related to the actual extension of the system. An event manager 508a and 508b coordinates the event handlers and events. Events are passed through the system through a centralized Event Manager 508a and 508b. Plug-In DCS and batch adaptors 506a and 506b and event handlers 510a-510an and 510b-510bn can subscribe to receive events that are raised via the Event Manager 508a and 508b. The event handlers may provide a system to persist (save and restore) various information between computer A 501a and computer B 501b to be persisted. When an event is determined to be updated, a persist agent 512a updates the other persist agent 512b via a peer-to-peer communication layer 514. each event manager 508a and 508b notifies the respective batch adapter 506a and 506b of subscribed changes for data that is being persisted and saved to file. Each persist agent 512a and 512b restores persisted data on, for example, startup to the respective event manager 508a and 508b.

Figure 6:
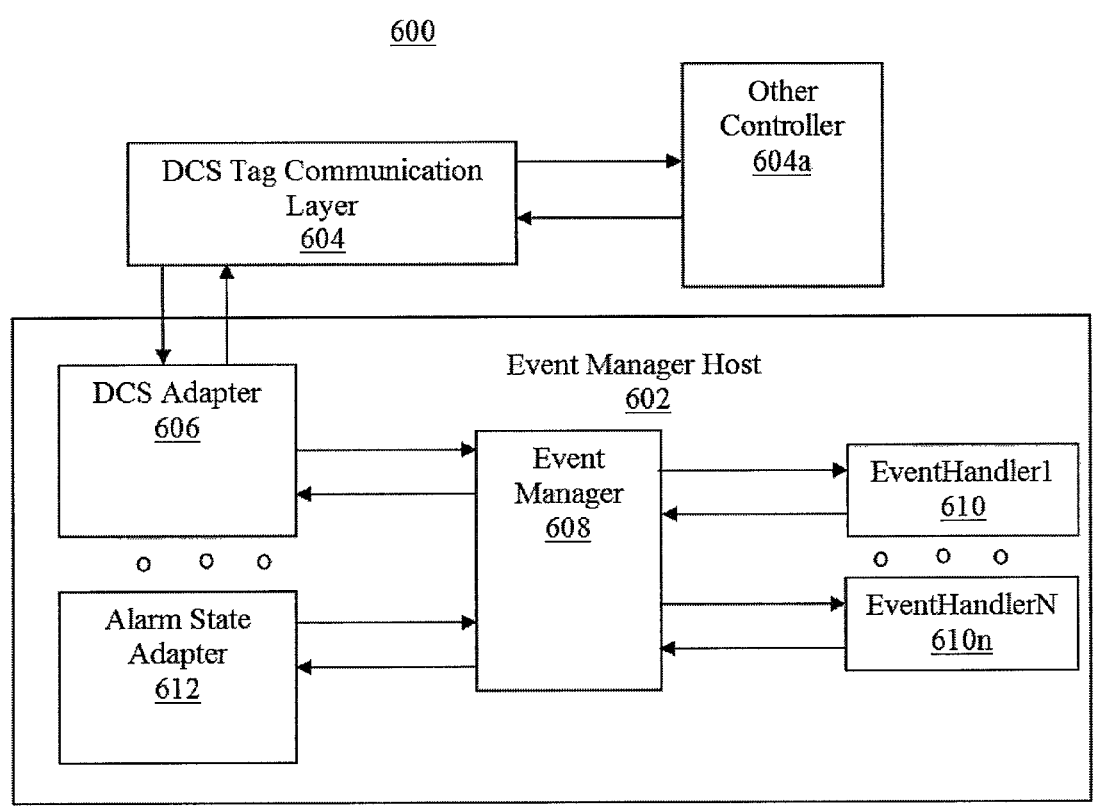
FIG. 6 is a block diagram of an exemplary event state management system using event based runtime extension framework architecture 600 according to the present invention.

Referring to FIG. 6, a possible configuration for event state management system using event based runtime extension framework architecture 600 is shown. An event manager host 602 receives and transmits external events from a DCS Tag communication layer 604 received from other controllers 604a. One or more external event handlers acting as DCS adaptors 606 may be configured to convert, translate, transmit, receive and/or identify events.

Internal event handlers 610-610n handle responses to events related to the actual extension of the system. An event manager 608 coordinates the event handlers and events. Events are passed through the system through a centralized Event Manager 608. Plug-In event handlers 610 can subscribe to receive events that are raised via the Event Manager 608. An alarm state adapter 612 can be used to adapt the alarm state behavior of one DCS controller to fit the alarm state behavior that is expected of a specific DCS HMI. The event manager 608 subscribes to controller data to be interpreted for alarming, and subscribes to alarm acknowledgement from DCS. The alarm state adapter 612 reports alarm state changes to the HMI and/or controller.

Figure 7:
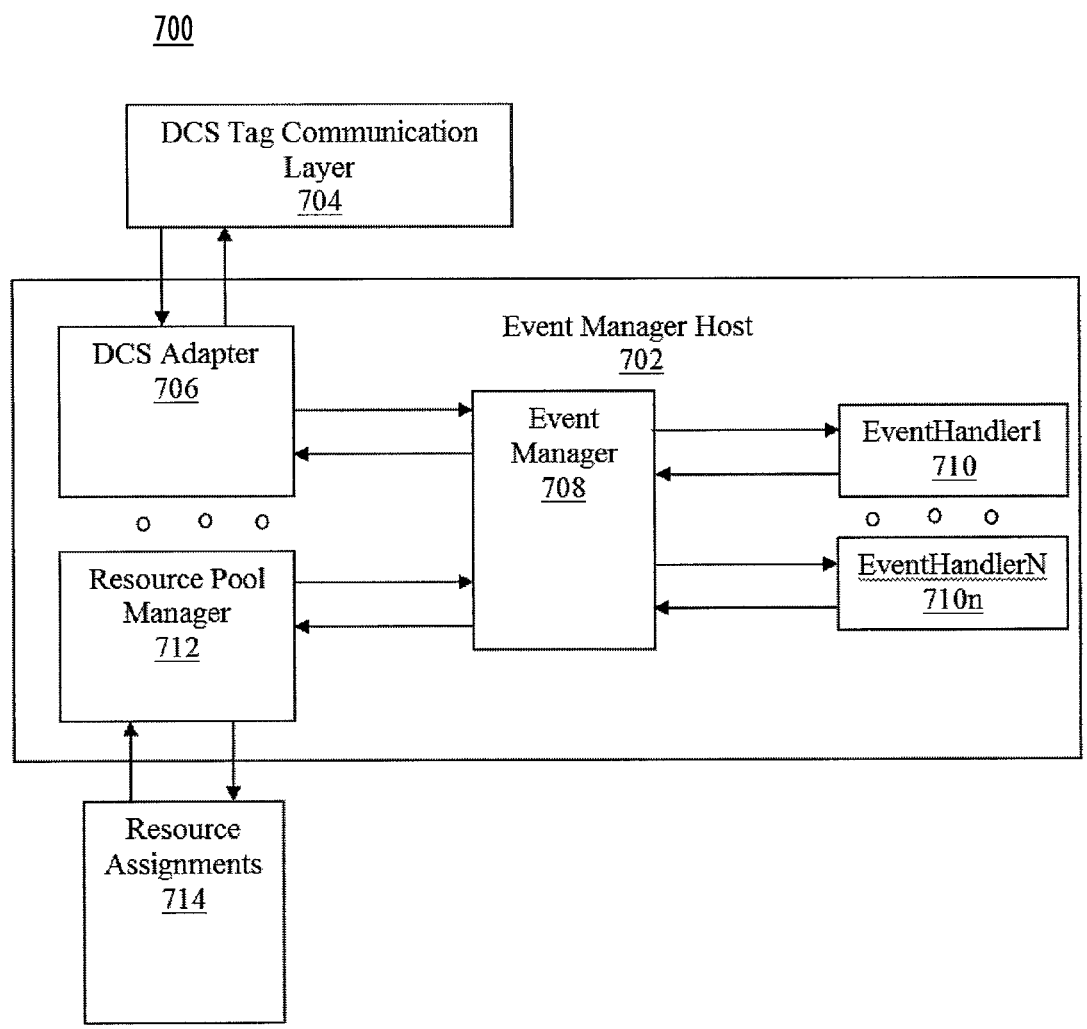
FIG. 7 is a block diagram of an exemplary resource pool management system using event based runtime extension framework architecture 700 according to the present invention.

Referring to FIG. 7, a possible configuration for resource pool management using event based runtime extension framework architecture 700 is shown. An event manager host 702 receives and transmits external events from a DCS Tag communication layer 704 received from other controllers. One or more external event handlers acting as DCS adaptors 706 may be configured to convert, translate, transmit, receive and/or identify events.

Internal event handlers 710-710n handle responses to events related to the actual extension of the system. An event manager 708 coordinates the event handlers and events. Events are passed through the system through a centralized event manager 708. Plug-In event handlers 710 can subscribe to receive events that are raised via the event manager 708. A resource pool manager 712 can be used to coordinate resource assignments 714. The event manager 708 and event handlers 710-710n can be used to provide an external resource pool management capability for a system that does not already provide such functionality. For example, if a DCS provides a data tag management functionality, it is possible to use "tags" as an interface to an external application that will serve to request the reservation of a limited resource and to notify a requester of a successful reservation. The event manager 708 subscribes to changes in Tag Data that will signal resource reservations to the resource pool manager 712. The resource pool manager 712 writes back to tag data to signal resource assignments to the event manager 708.

Figure 8:
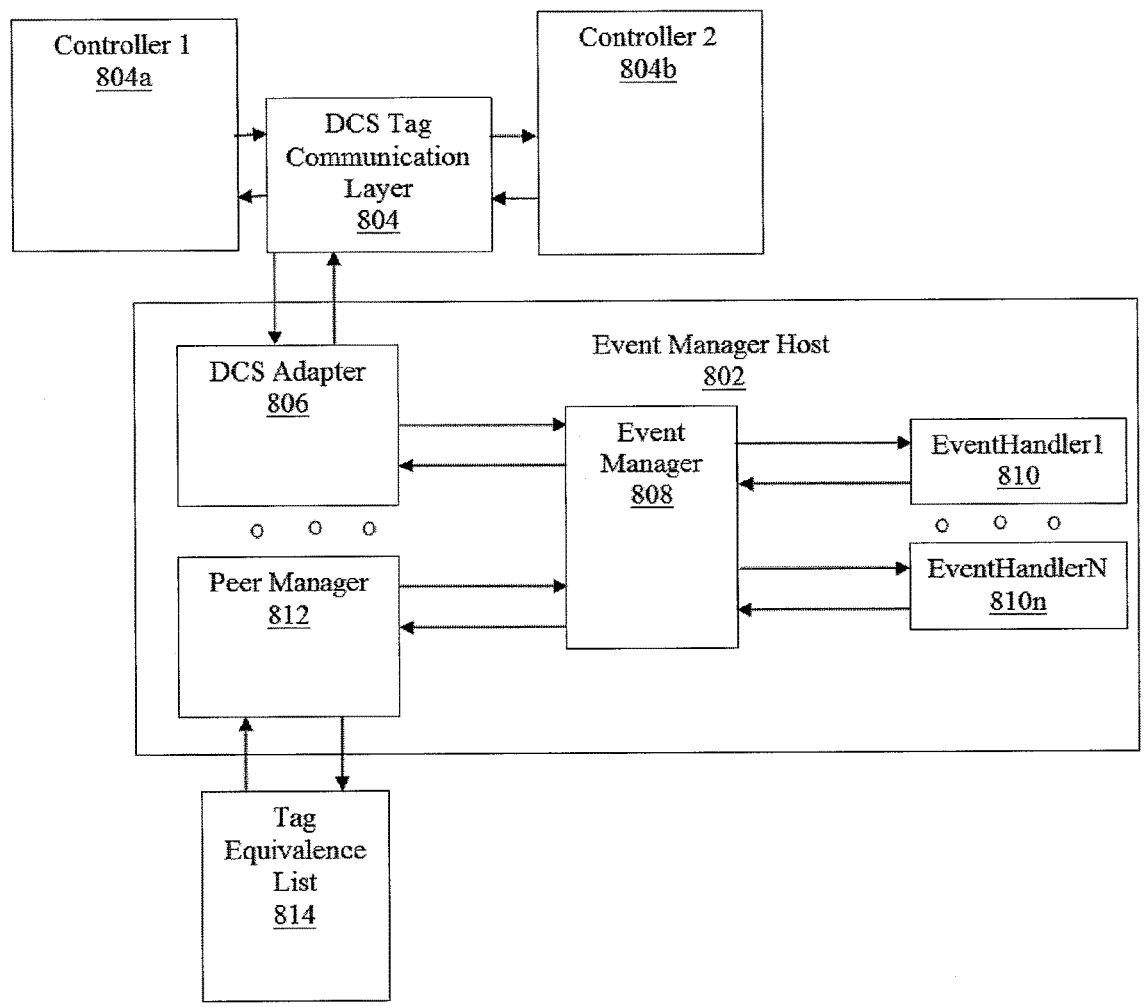
FIG. 8 is a block diagram of an exemplary peer-to-peer communication manager using event based runtime extension framework architecture 800 according to the present invention.

Referring to FIG. 8, a possible configuration for peer-to-peer communication manager using event based runtime extension framework architecture 800 is shown. An event manager host 802 receives and transmits external events from a DCS Tag communication layer 804 received from other controllers 804a and 804b. One or more external event handlers acting as DCS adaptors 806 may be configured to convert, translate, transmit, receive and/or identify events.

Internal event handlers 810-810n handle responses to events related to the actual extension of the system. An event manager 808 coordinates the event handlers and events. Events are passed through the system through a centralized Event Manager 808. Plug-In event handlers 810 can subscribe to receive events that are raised via the Event Manager 808. A peer manager 812 can be used to coordinate tag equivalence list 814. For example, assume a DCS has a mechanism for communicating to tag data with two different controllers. It is possible to configure an "equivalence" list, so that a change to a tag in one controller is reflected to a different tag in the other controller. The event manager 808 subscribes to changes to tags that are to be "equivalenced" in a peer manager 812. The peer manager 812 writes tag values to peer controller to the event manager 808.

The present invention is not intended to be limited to a system, device, or method which must satisfy one or more of any stated or implied object or feature of the invention and is not limited to the exemplary embodiments described herein. Modifications and substitutions by one of ordinary skill in the art are considered to be within the scope of the present invention.

The invention claimed is:

1. A system comprising:
   an event manager, at a computing device, adapted to direct events received from a human machine interface to a plurality of event handlers;
   a plurality of external event handlers adapted to receive and process events associated with implementing a protocol translation for at least one application program interface associated with a respective component, the protocol translation translating commands from the event manager having no inherent meaning to the respective component into commands that can later be ascertained by the respective component and supporting an extension of application behavior of the at least one application program interface, wherein each of the plurality of external event handlers is subscribed to receive a respective event or category of event from the event manager and each of the plurality of external event handlers is adapted to perform a protocol translation associated with the respective event or category of event to which that external event handler is subscribed; and
   at least one internal event handler adapted to receive events related to an extension of the human interface supporting the protocol translation and process the events to facilitate the extension of the human machine interface.

2. The system of claim 1, wherein one or more of the plurality of external event handlers is subscribed to receive events received at the event manager from the human machine interface and one or more of the plurality of external event handlers is subscribed to receive events directed to the human machine interface.

3. The system of claim 1, wherein each of the plurality of event handlers have plug-in capability.

4. The system of claim 1, wherein the event manager defines composite behaviors of the plurality of event handlers based on controlling factors loaded at the system.

5. The system of claim 4, wherein the composite behaviors are governed by calls to an object model.

6. The system of claim 4, wherein the composite behaviors are saved as a persistent definition in a persistent storage format to allow the system to restore the composite behaviors by loading the persistent definition.

7. The system of claim 1, wherein the protocol translation defines an aggregate behavior for the at least one application program interface.

8. A system for use in a distributed control system comprising:
  an event manager, at a computing device, adapted to direct events received from a human machine interface of a distributed control system to a plurality of event handlers;
  a plurality of external event handlers adapted to receive and process events associated with implementing a protocol translation for at least one application program interface associated with a respective component, the protocol translation translating commands from the event manager having no inherent meaning to the respective component into commands that can later be ascertained by the respective component and supporting an extension of application behavior of the at least one application program interface, wherein each of the plurality of external event handlers is subscribed to receive a respective event or category of event from the event manager and each of the plurality of external event handlers is adapted to perform a protocol translation associated with the respective event or category of event to which that external event handler is subscribed; and
  at least one internal event handler adapted to receive events related to an extension of the human machine interface supporting the protocol translation and process the events to facilitate the extension of the human machine interface.

9. The system of claim 8, wherein one of the plurality of external event handlers is a distributed control system adapter; one of the plurality of external event handlers is a batch adapter; and the event manager is a batch manager for controllers associated with the distributed control system.

10. The system of claim 8, wherein one of the plurality of external event handlers is a distributed control system adapter; one of the plurality of external event handlers is a persist agent for determining events stored in a persisted data store; and the event manager provides persist runtime state information to the plurality of event handlers.

11. The system of claim 8, wherein one of the plurality of external event handlers is a distributed control system adapter; one of the plurality of external event handlers is a persist agent for determining when events are communicated to controllers of the distributed control system; and the event manager provides synchronization of state information to the distributed control system.

12. The system of claim 8, wherein one of the plurality of external event handlers is a distributed control system adapter; one of the plurality of external event handlers is an alarm state adapter for communicating with a controller of the distributed control system and the human machine interface; and the event manager is adapted to coordinate alarm behavior between the controller and the human machine interface.

13. The system of claim 8, wherein one of the plurality of external event handlers is a distributed control system adapter; one of the plurality of external event handlers is a resource pool manager; and the event manager is adapted to coordinate pooled resources of the distributed control system.

14. The system of claim 8, wherein one of the plurality of external event handlers is a distributed control system adapter; one of the plurality of external event handlers is a peer manager adapted to coordinate resource assignment of the distributed control system; and the event manager is adapted to coordinate between two or more controllers of the distributed control system.

15. A method comprising:
  receiving, by an event manager, a plurality of events,
  directing events associated with implementing a protocol translation with at least one application program interface associated with a respective component to a plurality of external event handlers to process the events associated with implementing the protocol translation, the protocol translation translating commands from the event manager having no inherent meaning to the respective component into commands that can later be ascertained by the respective component and supporting an extension of application behavior of the at least one application program interface, wherein each of the plurality of external event handlers is subscribed to receive a respective event or category of event from the event manager and directing the events associated with implementing the protocol translation comprises directing each event to one of the plurality of external event handlers that is subscribed to receive that event or category of event; and
  directing events related to an extension of a human machine interface supporting the protocol translation to at least one internal event handler to process the events to facilitate the extension of the human machine interface.

16. The method of claim 15, wherein one or more of the plurality of external event handlers is subscribed to receive events received at the event manager from the human machine interface and one or more of the plurality of external event handlers is subscribed to receive events directed to the human machine interface.

17. The method of claim 15, wherein the at least one external event handler and the at least one internal event handler have plug-in capability.

18. The method of claim 15, wherein the external event handlers provide a standard event based interface.

19. The method of claim 15, wherein the protocol translation includes analyzing access tag data associated with the at least one application program interface.

20. The method of claim 15, wherein one of the plurality of external event handlers is a distributed control system adapter, one of the plurality of external event handlers is a batch adapter, and the event manager is a batch manager for controllers of the distributed control system.

* * * * *